R. F. STEWART.
BUTTER CUTTER.
APPLICATION FILED APR. 26, 1910.
998,722.
Patented July 25, 1911.
2 SHEETS—SHEET 2.
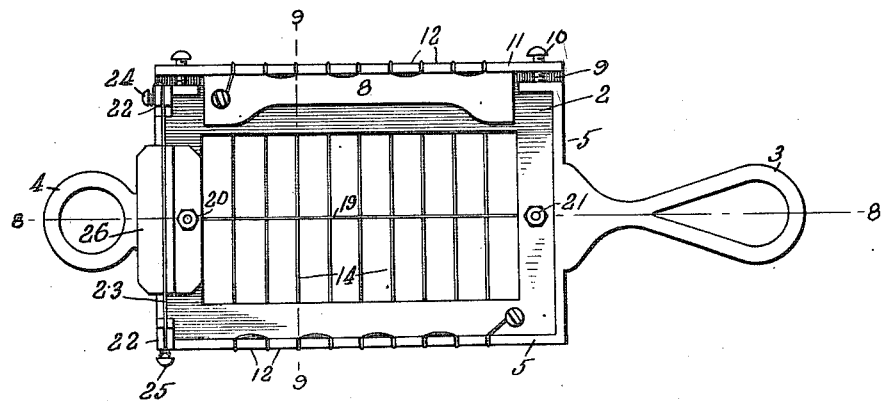
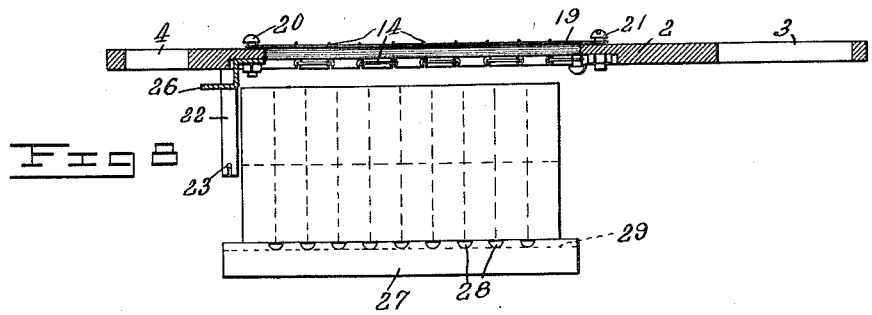
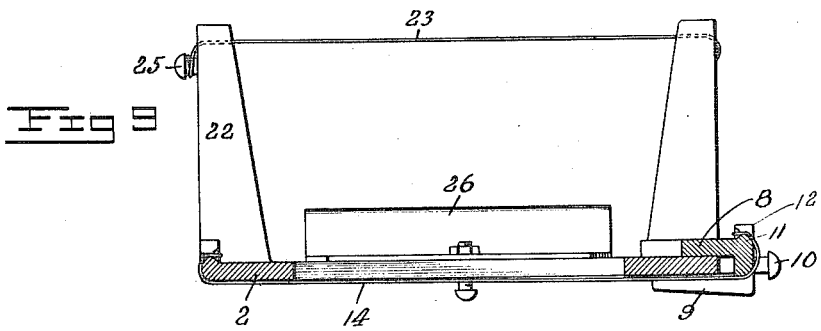
Inventor
Richard F. Stewart
Witnesses
By
Attorneys

UNITED STATES PATENT OFFICE.

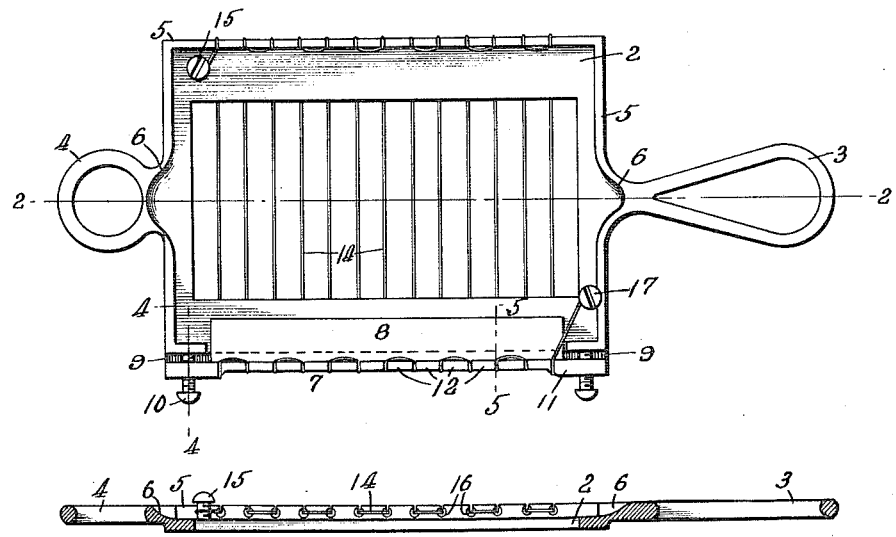
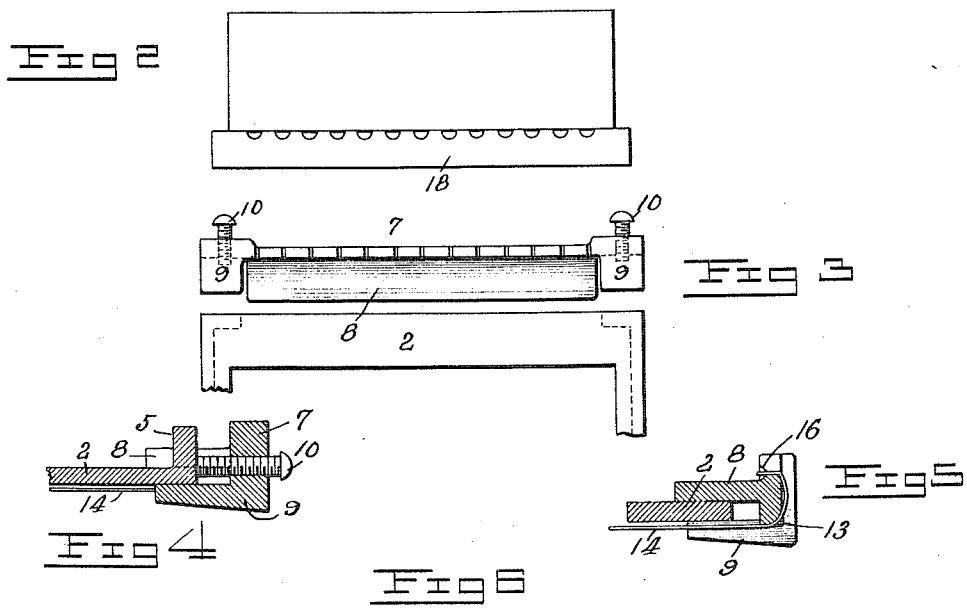

RICHARD F. STEWART, OF BRIARCLIFF MANOR, NEW YORK.

BUTTER-CUTTER.

998,722.

Specification of Letters Patent.

Patented July 25, 1911.

Application filed April 26, 1910. Serial No. 557,826.

*To all whom it may concern:*

Be it known that I, RICHARD F. STEWART, a citizen of the United States, residing at Briarcliff Manor, in the county of Westchester and State of New York, have invented new and useful Improvements in Butter-Cutters, of which the following is a specification.

The present invention relates to butter cutting implements designed to divide prints of butter into individual pats or pieces.

It has for its object the production of a tool or implement of small initial cost which is efficient in service and easy of manipulation, and in which the cutting element proper (a tensioned wire) may be readily renewed if broken, adjusted for various sizes of pats, and tensioned when slack. I accomplish these objects by providing a rigid continuous frame of suitable shape and dimensions (a rectangular pound print cutter being shown) having proper handles for manipulating it, said frame supporting a cutting wire or wires which are strung across its inclosed space. One limb of said continuous frame is provided with an independent adjustable wire-carrying and tightening bar to provide for the proper tensioning of the wire after stringing, wire-receiving kerfs being formed in the bar to receive the wire and hold the crossing strands in proper spaced relation. By providing a continuous frame I secure an absolutely rigid construction, and by the supplemental or independent bar I am able to secure the tensioning of the wire satisfactorily.

In order that the invention may be understood by those skilled in the art to which it belongs I have illustrated in the accompanying drawings one embodiment of my invention, and that the best now known to me. It will be understood, however, that this disclosure is merely illustrative and in no way restrictive of the invention, the physical expression of which may obviously be varied within the range of mechanical expedients without departing from the spirit thereof.

In said drawings—Figure 1 is a top plan view of the implement. Fig. 2 is a sectional view on line 2—2 of Fig. 1, a print of butter being shown in elevation below the cutter. Fig. 3 is a top plan view showing the wire-carrying and tensioning bar separated from the limb of the rigid frame. Figs. 4, 5 and 6 are detail views showing portions of the wire-carrying bar and the frame. Fig. 7 is a bottom view of an implement similar to that shown in Fig. 1 and having certain additional features. Fig. 8 is a sectional view of the implement shown in Fig. 7, a print of butter being shown in elevation. Fig. 9 is a sectional view, on an enlarged scale, taken on line 9—9 of Fig. 7, to show the print halving cutter.

Referring to the drawings by numerals, like numbers designating like parts in the several views, 2 indicates a frame of rectangular form and of the dimensions to handle a pound print of butter. While the frame is shown as rectangular it will be understood that its shape may be varied, and it is apparent, also, that it may be made of any size.

At one end of the frame 2 is a handle or grip 3 which is preferably made of such length and size as to give a full hand grip for the right hand, while at the other end is a smaller grip 4 designed as a thumb and finger grip for the left hand, such details as these grips, however, may be widely varied to meet the fancy or demand of users. On one side of the frame 2, which may be called the upper side and along one side limb thereof, is formed a rib, as 5, which projects upwardly therefrom and is preferably integral therewith, this rib 5 turning the corners of the frame and extending along the end limbs, though somewhat flattened at the juncture of the frame and handles, as at 6, to give thumb holds in manipulating the tool. The other side limb of the tool carries an independent and adjustable bar 7, formed with a long lug 8 on one side and two lugs 9, one at each end, on the opposite side, so as to straddle the limb of the frame 2 on that side, suitable adjusting screws 10 being provided at each end to permit the position of the bar 7 to be varied. The said bar 7 has an upstanding rib 11 similar to the rib 5 on the opposite side limb of the frame 2, and each of the ribs 5 and 11 is provided with opposed kerfs at regular intervals so that a series of closely adjacent lugs 12 are provided. In line with the kerfs on the under side of the frame 2 the side limbs are notched or kerfed, as at 13 (see Fig. 5). Across this frame a continuous cutting wire 14 is laid, one end of the wire being secured to an anchor lug or screw 15 at or near one corner of the frame, and from this anchor 15 the wire 14 is carried back and forth transversely of the frame in as closely adjacent strands as may be desired, the wire being looped about the lugs 12 and lying in the kerfs, as shown. The kerfs are preferably flared or rounded out slightly, as at 16, to prevent bending the wire 14 across a sharp cutting angle at the kerf, and this may be conveniently accomplished by drilling the kerf so as to give a flaring mouth in which the wire will lie. Furthermore, by thus flaring the kerfs the loops of wire 14 which engage lugs 12 are unlikely to slip off, but are, when tensioned, held securely in place. The wire 14 will preferably be laid across the frame with the adjustable bar 7 in its innermost position, and the said wire after being drawn as tightly as is feasible by hand, has its other end anchored to a lug or screw 17 at or near the corner of the frame. After this is done the wire is tensioned and brought to the desired degree of tautness by adjusting the bar 7, through the medium of screws 10, away from the frame. It will be seen that in this manner a simultaneous adjustment of the wire strands is secured when the tool parts are assembled and set up, and that tightening of the wire if it stretches in use or when replaced is readily accomplished.

Preferably the tool is designed to work with a cutting board or plate 18, which in the present instance is shown of the size of a one pound print of butter, said plate 18 having transverse grooves on its upper surface to receive the strands of the cutting wire 14 and insure complete separation of the pats.

Though the use of the tool will, it is thought, be obvious from the foregoing description, it will be briefly set forth. A print, either square, round, or other shape in cross section, having been placed upon the grooved face of the cutting board or plate, the tool will be properly positioned so as to register the print to be cut within the wire-crossed frame-aperture and will then be forced downwardly over the print, the wire severing the print completely into pats.

In the form shown in Figs. 1, 2, and 3, and above described, the tool is designed to separate a print into fourteen pats of a size equal to the cross-sectional area of the print.

In the development of the invention shown in Figs. 7, 8, and 9, I have shown a type by which the print may be divided into smaller pieces. The tool shown in these last-named figures is identical in mechanical construction with that just described, but has additionally a centrally placed longitudinal wire 19 secured at one end to an anchor lug or screw 20, and at its other end being threaded through a turning key or screw 21 by which it may be tightened. It is clear that said wire 19 will divide the pats cut by the transverse wires in two parts. Another feature of this form of my invention is the means whereby a print of butter may be initially halved into two blocks prior to cutting the pats. This involves the addition of two legs 22 at opposite corners of the frame at one end thereof, the said legs 22 being kerfed at their tips, as shown to receive a wire 23, an anchor lug or screw 24 on one leg holding the wire 23 at one end, while the other end of the wire 23 is threaded through a turning key or screw 25 by which it may be tightened. This provides an offset cutting wire adapted to be passed lengthwise of a print and halve it into two slabs or bars. In order that the division may be accurate and in order that the tool may not mutilate or mar the top of the print in this halving operation, I place a guide-plate 26 on the frame of the tool, as best shown in Fig. 8, this plate being just the proper distance from the wire 23 to give a division of a standard pound print into two equal parts, and obviously the smooth under surface of the plate 26 will trail over the print without injury to it.

With the tool just described is used a cutting board or plate 27 which has, in addition to the transverse grooves 28, a longitudinal groove 29 to receive the wire 19. In using this type of tool it is proposed to first slice the print with the halving wire 23 into two parts, and then separate the halved print transversely and longitudinally into pats, the result, in the embodiment shown being forty pats from a pound print. While I refer to this initial separating of the print, as "halving," it will be understood that I do not limit the construction to this exact thing as the wire for doing this may, of course be positioned so as to cut or slab the print wherever desired. Furthermore, such departures from this disclosure as are in the nature of mechanical variations and expedients are, it will be understood, regarded as within the purview of the invention.

I claim:—

1. A butter cutter comprising a rigid frame having integral side and end limbs and provided with operating handles, an integral kerfed wire-receiving rib on one side limb of said frame, an independent bar having a kerfed wire-receiving rib adjustably mounted on the opposite side limb of said frame, and a cutting wire laid transversely of said frame from said kerfed side limb to said independent kerfed bar.

2. A butter cutter comprising a frame provided with operating handles, an upstanding stiffening rib extending across the ends and along one side limb of said frame and having wire-receiving kerfs formed therein, an unribbed limb on the opposite side of said frame, an independent bar having end-lugs on one side and an intermediate elongated lug on the other side adapted to straddle said unribbed side limb, a kerfed wire-receiving rib on said independent bar, adjusting screws at each end of said independent bar, and a cutting wire laid transversely of said frame from said kerfed side limb to said kerfed bar.

3. A butter cutter comprising a continuous rectangular rigid frame, a kerfed wire-receiving stiffening rib rising vertically from one limb of said frame, an independent bar provided with limb-straddling lugs slidably mounted on the opposite side limb of said frame, means for adjusting said bar to and from the side limb, a kerfed wire-receiving rib rising vertically from said bar, and a continuous cutting wire laid transversely of said frame from said kerfed side limb to said kerfed bar.

4. A butter cutter comprising a frame, a wire-receiving rib on said frame to receive the loops of a cutting wire, said rib having wire-receiving kerfs provided with flared mouths to eliminate wire-cutting angles.

5. A butter cutter comprising a frame having wire-receiving kerfs having flared mouths to eliminate wire-cutting angles, and a cutting wire laid in said kerfs.

6. A butter cutter comprising a frame, legs depending therefrom, a print-dividing wire tensioned across the lower end of said legs, and a guide plate carried by said frame above said dividing wire.

7. A butter cutter comprising an apertured frame having a series of pat-forming strands laid across said aperture, legs depending from said frame near one end thereof, a print-dividing wire tensioned across the ends of said legs, and a guide plate on said frame above said dividing wire.

8. A butter cutter comprising an apertured frame, pat-forming wires laid across said aperture, kerfed legs depending from said frame at one end, a print dividing wire tensioned across the ends of said kerfed legs, and a guide plate secured to said frame above said dividing wire.

In testimony whereof I have hereunto set my hand in presence of two subscribing witnesses.

RICHARD F. STEWART.

Witnesses:
KATHERINE C. GLANVILLE,
WILLIAM A. PRATT.